United States Patent [19]

Vagman

[11] 4,297,784
[45] Nov. 3, 1981

[54] METHOD FOR MOUNTING MOTOR STATORS

[75] Inventor: Selmer Vagman, Emmaboda, Sweden

[73] Assignee: ITT Industries, Inc., New York, N.Y.

[21] Appl. No.: 97,611

[22] Filed: Nov. 26, 1979

[30] Foreign Application Priority Data

Dec. 12, 1978 [SE] Sweden .................................. 7812730

[51] Int. Cl.³ ........................................... H02K 15/14
[52] U.S. Cl. ....................................... 29/596; 29/447; 310/42; 310/89
[58] Field of Search .................... 29/596, 447; 310/42, 310/89

[56] References Cited

U.S. PATENT DOCUMENTS 2,911,709 11/1959 Boynton ................................. 29/596
3,555,651 1/1971 Latussek et al. ................... 29/596 X Primary Examiner—Carl E. Hall
Attorney, Agent, or Firm—John T. O'Halloran; Peter C. Van Der Sluys

[57] ABSTRACT

A complete stator of an electric motor is mounted into a cylindrical sheet metal housing by first mounting the stator between two facing concentric mandrels. The housing, the inner diameter of which is less than the outer diameter of the stator is heated and then mounted over the mandrels and stator. After cooling, the stator and the mandrels are secured in the housing by shrinkage tension. By a smooth rolling of the housing surfaces contacting the mandrels, the tension is released and the mandrels are withdrawn.

5 Claims, 2 Drawing Figures

METHOD FOR MOUNTING MOTOR STATORS

BACKGROUND OF THE INVENTION

1. Field of the Invention

This invention relates to a method for mounting a complete stator and, more particularly, to a method for mounting such a stator in a surrounding housing having relatively thin walls made of, for instance, a sheet of non-corrosive material such as aluminum.

2. Description of the Prior Art

Heretofore stator housings have normally been formed with relatively rigid and thick walls which have been worked and given such measurements that the stator could be press-fit into the housing or the housing was heated prior to the mounting to obtain a shrink fit.

These methods mean that a relatively heavy construction is required which demands expensive pre- and post-working in order to secure an absolute concentricity between the bearing guidings for the rotor and the inner diameter of the stator.

SUMMARY OF THE INVENTION

These problems are solved according to the invention by sliding the stator on top of a flanged mandrel the rib diameter of which corresponds with the inner diameter of the stator, while the outer diameter of the stator almost corresponds with the diameter of the flanged part of the mandrel which will form the bearing guiding of the stator housing. Another mandrel is slided into and guided by the first mandrel thus forming a mandrel unit having a closed space where the coil ends of the stator are protected against heat. A cylindrical housing, the nominal diameter of which is somewhat less than the flange diameters of the mandrels, is heated and slided on top of the mandrel unit, thereafter cooled so that by shrinkage, the housing assumes the shape of the mandrels and stator. The mantle surfaces of the housing which make contact with the mandrels are rolled so that the shrinking tensions are released and the mandrels may be removed.

The method provides a lighter and cheaper construction without neglecting the demands on concentricity between stator and rotor and without any precision working on the details.

DESCRIPTION OF THE PREFERRED EMBODIMENT

Figure 1:
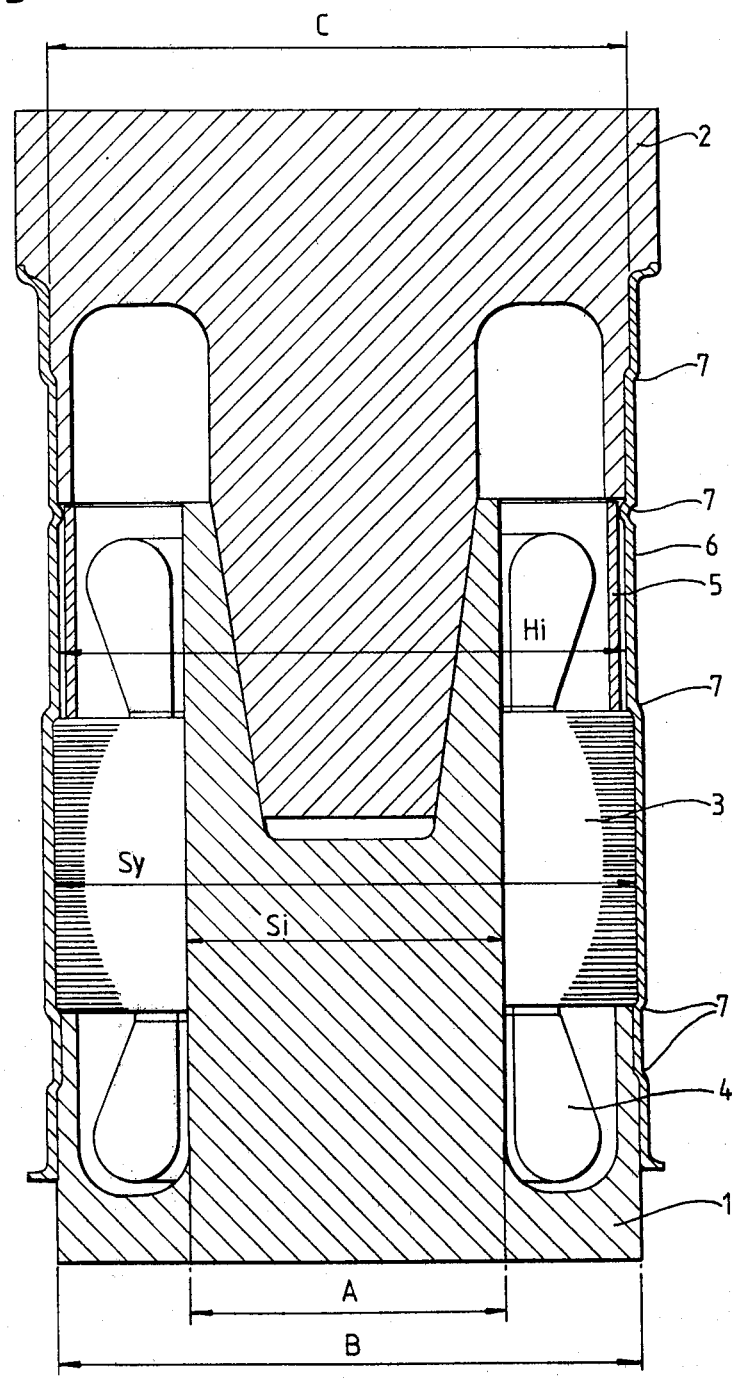
FIG. 1 shows the stator, mandrels and housing during mounting.
Figure 2:
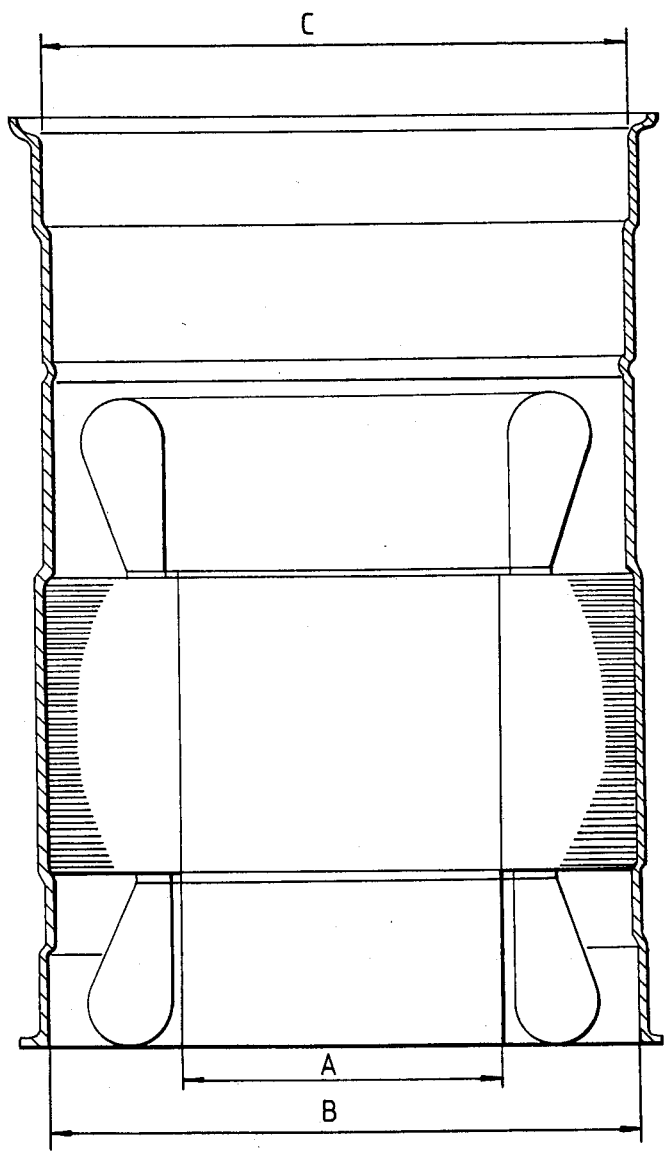
FIG. 2 shows the stator mounted in the housing.

In the drawings 1 and 2 stand for mandrels, 3 a stator having coiled ends 4, 5 a protecting shell, 6 a stator housing, 7 reinforcement grooves while A, B, C, Si and Hi are diameter measurements. The mounting takes place in the following manner:

Two mandrels 1 and 2 are guiding each other with great precision through conical surfaces. The diameter A is adapted to the inner diameter Si of the stator 3. The complete stator including winding and coil ends 4 is mounted on top of the mandrel 1. As the lengths of the stators within a group may differ, a heat protecting screen 5 is arranged on top of the stator and the mandrel 2 is placed in the guiding conical surface of the mandrel 1. The two mandrels then form a unit having a protected space for the winding of the stator. The stator housing 6 has the form of a flanged cylinder. The inner diameter Hi of the housing is less than the diameters B, C and Sy. The coefficient of thermal expansion of the housing is adapted to the coefficient of thermal expansion for each material.

The stator housing 6 is heated to a temperature where the thermal coefficient gives an increase of the diameter to Hi exceeding B, C and Sy. The mandrel unit, which remains at room temperature, is placed in the heated stator housing. When the housing is cooled, it is not allowed to go back to its original diameter measure but the material is stretched and shrinked around the mandrels and the stator. In order to make the housing 6 more rigid, grooves are rolled in its mantle surface. As a last step those parts of the mantle surface that make contact with the mandrels are rolled, the shrinking tensions are then released so that the mandrels can be drawn away.

Another method for loosening the mandrels is to press an air- or oilfilm in between the surfaces of the mandrels and the housing.

According to the invention, a method is thus provided to mount a complete stator into a surrounding housing very simply where the great demands on precision and concentricity between A, B and C are fulfilled without expensive cutting working being needed. The housing inner diameters B and C form bearing guides into which the rotor bearings may be placed so that they are concentric with A into which the rotor must fit.

What is claimed is:

1. A method for mounting a complete motor stator in a surrounding cylindrical housing, comprising the steps of:

sliding the stator on top of a flanged mandrel, the rib diameter of which corresponds to the inner diameter of the stator and the flange diameter approximately corresponds with the outer diameter of the stator to form a first bearing guide for the stator housing;

sliding a second mandrel into a guiding portion of the first mandrel so that the first and second mandrels form a concentric mandrel unit having a space in which the coils of the stator are disposed, an outer diameter of the second mandrel forming a second bearing guide for the stator housing;

heating a cylindrical stator housing, the nominal inner diameter of which is somewhat less than the outer diameters of the stator and first and second mandrels to expand said housing;

sliding the heated and expanded housing over the mandrel unit;

cooling said housing whereby the housing is shrunk-fit around the mandrel unit and stator; and loosening and removing said mandrels from the stator housing.

2. A method for mounting a complete motor stator in a surrounding cylindrical formed housing as described in claim 1 wherein the step of loosening and removing the mandrels from the housing is accomplished by rolling the surfaces of the housing that make contact with the flanges of the mandrel to thereby release the shrinking tension so that the mandrels may be removed.

3. A method for mounting a complete motor stator in a surrounding cylindrical formed housing as described in claim 1 wherein the step of loosening and removing the mandrels comprises the step of pressing air between the contact surfaces of the mandrels and the housing.

4. A method for mounting a complete motor stator in a surrounding cylindrical formed housing as described in claim 1 wherein the step of loosening and removing the mandrels comprises the step of pressing an oil film between the contact surfaces of the mandrels and the housing.

5. A method for mounting a complete motor stator in a surrounding cylindrical formed housing as described in claim 1, additionally including the step of rolling grooves in the mantle surface of the housing whereby the housing is made more rigid.

* * * * *